(12) United States Patent
Fischer et al.

(10) Patent No.: US 7,264,293 B2
(45) Date of Patent: Sep. 4, 2007

(54) DEVICE FOR CONNECTING A VEHICLE SEAT TO A VEHICLE FLOOR

(75) Inventors: Matthias Fischer, Kronach (DE); Jochen Hofmann, Markgraitz (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 0 days.

(21) Appl. No.: 10/547,890

(22) PCT Filed: Mar. 3, 2004

(86) PCT No.: PCT/DE2004/000438

§ 371 (c)(1),
(2), (4) Date: Sep. 2, 2005

(87) PCT Pub. No.: WO2004/080750

PCT Pub. Date: Sep. 23, 2004

(65) Prior Publication Data

US 2006/0113816 A1     Jun. 1, 2006

(30) Foreign Application Priority Data

Mar. 14, 2003   (DE)   ................................. 203 04 508

(51) Int. Cl.
*B60N 2/04* (2006.01)
(52) U.S. Cl. .................. 296/65.03; 297/336; 248/503.1
(58) Field of Classification Search ............. 296/65.03; 297/336; 248/503.1
See application file for complete search history.

(56) References Cited

U.S. PATENT DOCUMENTS 4,736,985 A     4/1988   Fourrey et al.

(Continued)

FOREIGN PATENT DOCUMENTS

DE     44 04 935 A1     8/1995

(Continued)

OTHER PUBLICATIONS

International Search Report dated Sep. 27, 2004, of corresponding PCT/DE2004/000438.
English translation of International Preliminary Examination Report dated Feb. 22, 2006 for PCT/DE2004/000438.

*Primary Examiner*—Dennis H. Pedder
(74) *Attorney, Agent, or Firm*—Christie, Parker & Hale, LLP

(57) ABSTRACT

The invention relates to a device for connecting a vehicle seat to a vehicle floor, said device comprising at least one connecting element, which can be engaged with a locking element that is connected to a lateral seat section or the guide rail of the vehicle seat and can be actuated using an unlocking lever The inventive device is equipped with a slide control element that acts between the lateral seat section or the guide rail, the locking element and the unlocking lever. In a locked position and during a first phase for unlocking the vehicle seat by actuating the unlocking lever, said slide control element maintains the lock between the connecting element and the locking element until a predefined intermediate position is reached. In a second phase for unlocking the vehicle seat, the slide control element moves the locking element into an unlocking position, releasing the lock between the connecting element, the locking element and the lateral seat section or the guide rail (1) of the vehicle seat.

18 Claims, 4 Drawing Sheets

U.S. PATENT DOCUMENTS

| | | | |
|---|---|---|---|
| 5,238,285 A | 8/1993 | Holdampf et al. | |
| 5,626,391 A | 5/1997 | Miller et al. | |
| 5,667,232 A | 9/1997 | Gogan et al. | |
| 5,730,480 A * | 3/1998 | Takamura | 248/503.1 |
| 5,762,401 A * | 6/1998 | Bernard | 297/378.13 |
| 6,036,252 A * | 3/2000 | Hecksel et al. | 296/65.03 |
| 6,234,574 B1 | 5/2001 | Hoshihara et al. | |
| 6,244,649 B1 | 6/2001 | Scheck et al. | |
| 6,345,856 B1 | 2/2002 | Minai | |
| 6,629,710 B1 | 10/2003 | Shafry et al. | |
| 2002/0043605 A1 | 4/2002 | Hibino et al. | |
| 2004/0066055 A1 * | 4/2004 | Otto | 296/65.03 |

FOREIGN PATENT DOCUMENTS

| | | |
|---|---|---|
| DE | 195 14 380 A1 | 11/1995 |
| DE | 295 22 335 U1 | 5/2002 |
| EP | 1 068 985 A1 | 1/2001 |

* cited by examiner

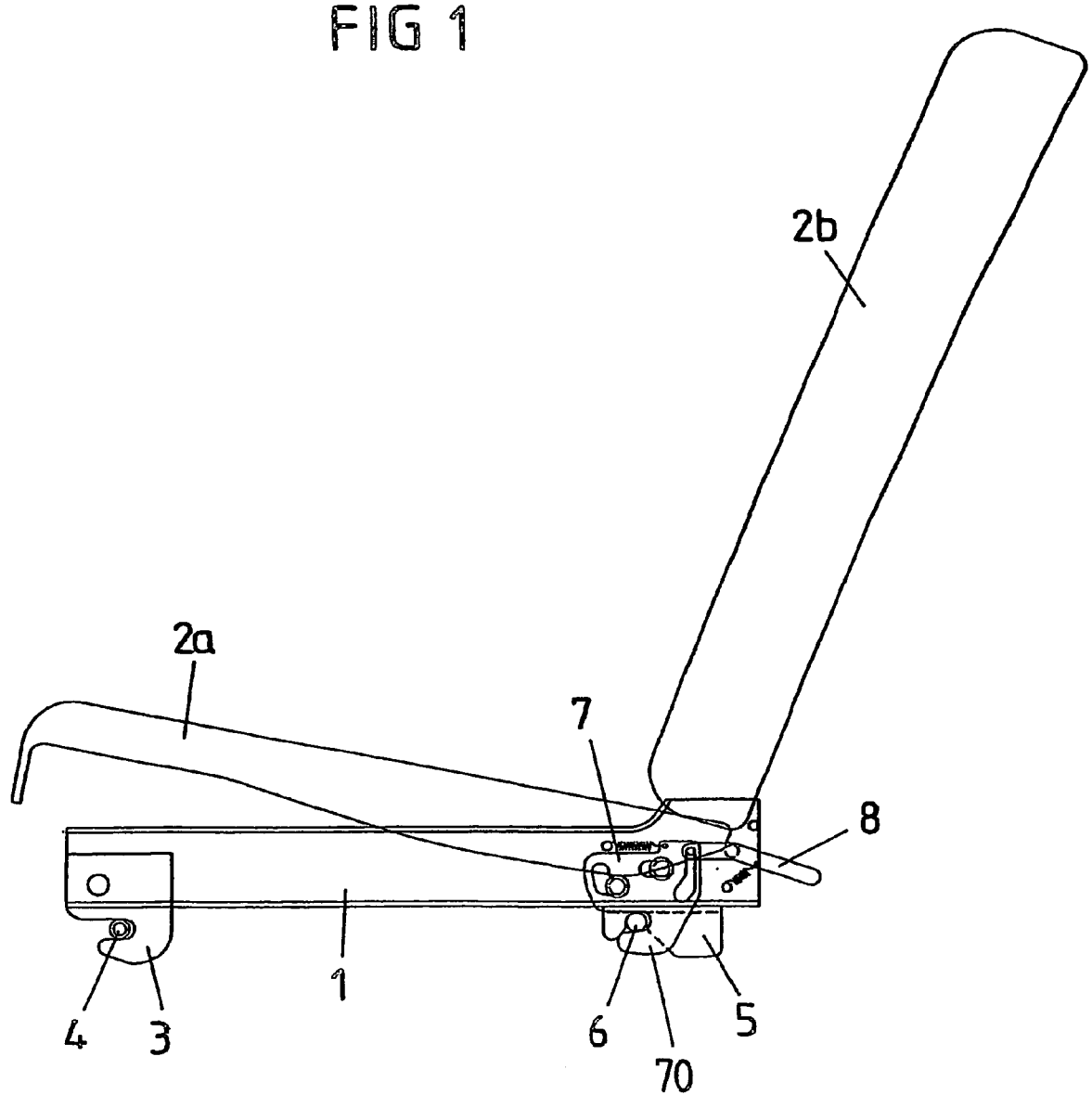

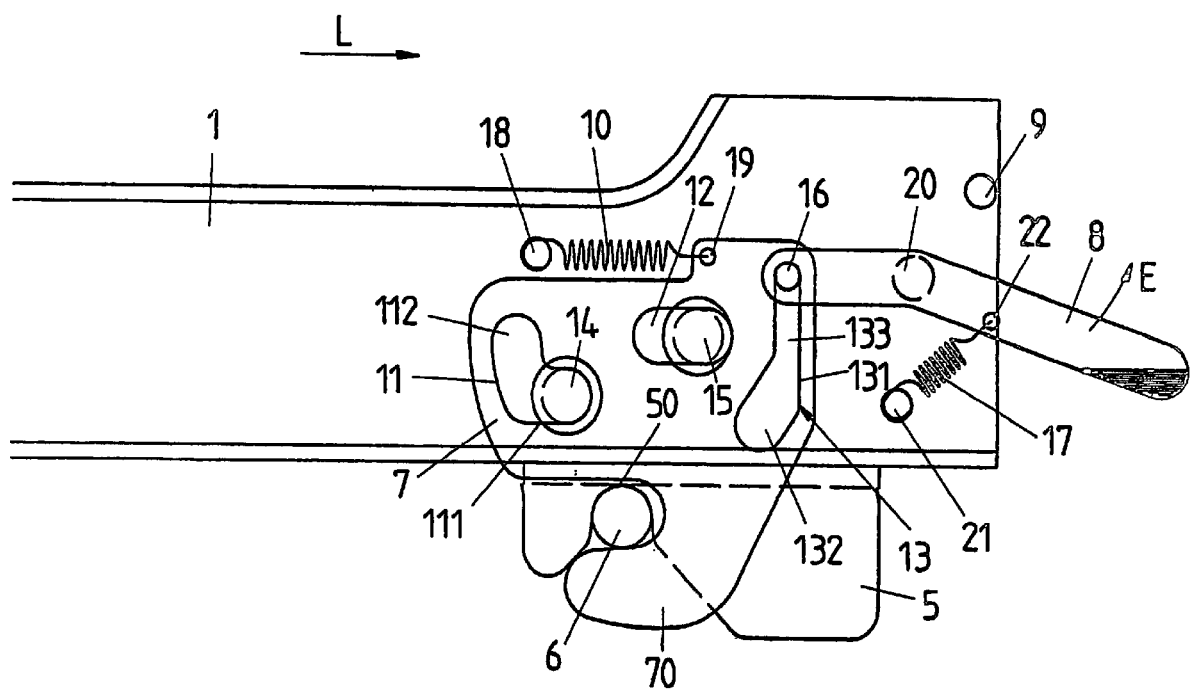

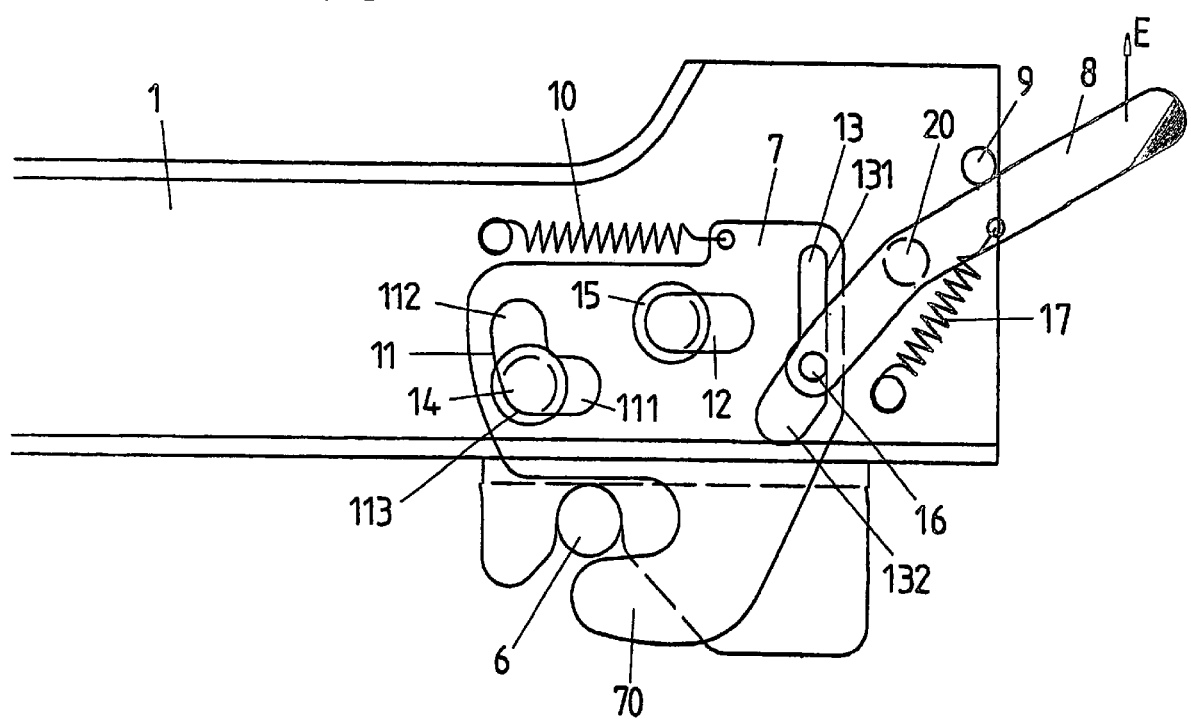

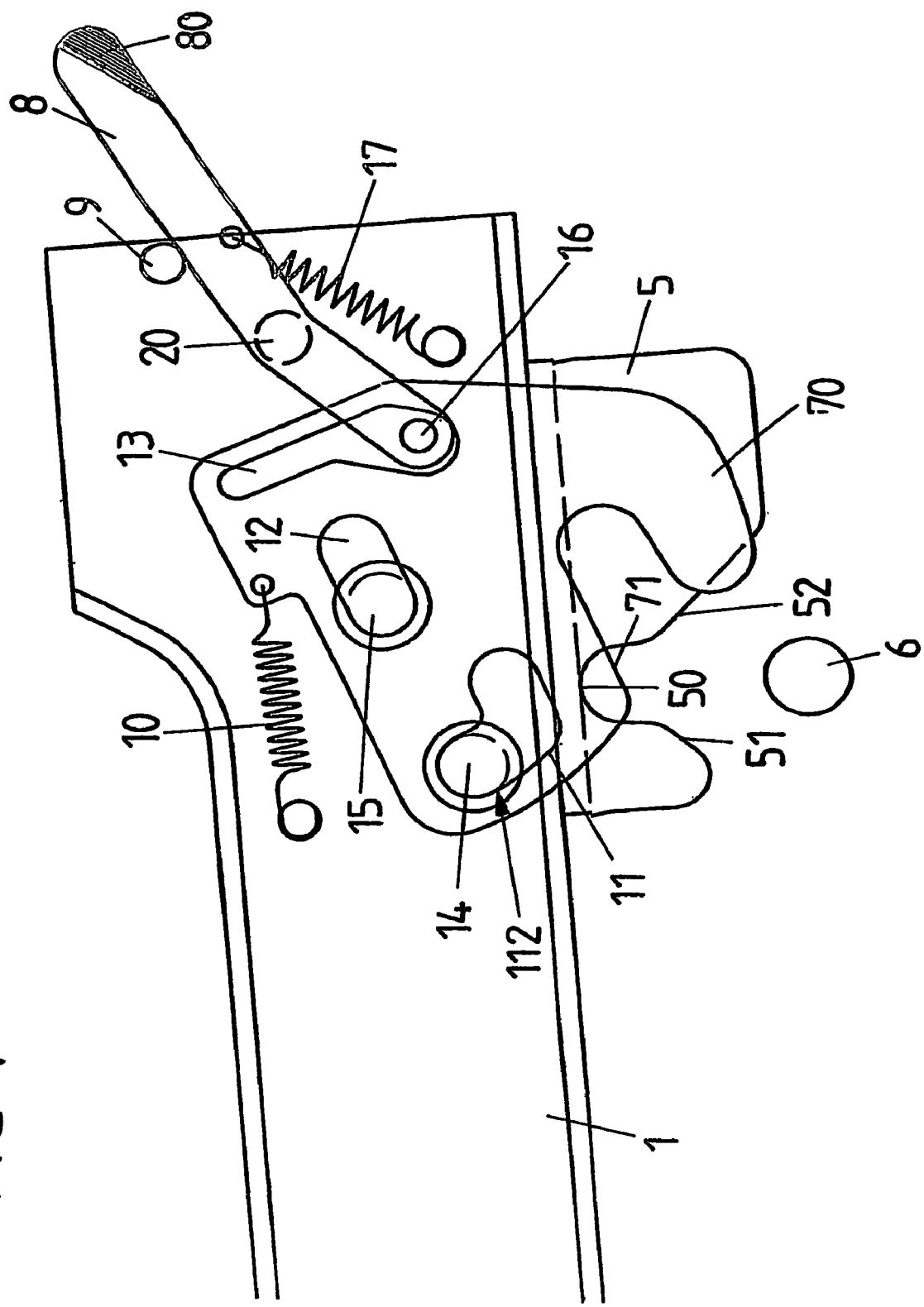

DEVICE FOR CONNECTING A VEHICLE SEAT TO A VEHICLE FLOOR

CROSS-REFERENCE TO A RELATED APPLICATION

This application is a National Phase Patent Application of International Application Number PCT/DE2004/000438, filed on Mar. 3, 2004, which claims priority of German Utility Model Number 203 04 508.4, filed on Mar. 14, 2003.

BACKGROUND

The invention relates to a device for connecting a vehicle seat to a vehicle floor.

From the German Patent Application No. 44 04 935 A1 a device is known for connecting a vehicle seat to a vehicle floor which has, in the drive direction of the vehicle, front and rear bearing elements for receiving front and rear connecting elements which are connected to the vehicle seat. The rear connecting element consists of a support part and a locking device connected for articulated movement to the support part and containing a locking lever which has two lever arms and is able to pivot about a fixing axis connected to the support part. One of the two lever arms of the locking lever is designed as a locking hook which can be brought into engagement with a bolt of the rear bearing element of the vehicle floor.

Through this design the locking device moves the vehicle seat on unlocking into a removal position whilst on installing the vehicle seat it is first held in a release position and then moved into a locking position. This ensures both a simple and secure seat locking and easier handling when unlocking and removing the vehicle seat. However in order to fit the locking device with the locking lever which has two lever arms it is necessary to provide a corresponding structural space underneath the seat side part of the vehicle seat.

The object of the present invention is to provide a device for connecting a vehicle seat to a vehicle floor of the type already mentioned which with few component parts with minimum space required and in particular without additional structural space between the vehicle floor and the seat side part ensures a secure and play-free locking of the vehicle seat even in the event of a crash and ensures high operating comfort both when removing and inserting the vehicle seat.

BRIEF DESCRIPTION

The device according to the invention requires only few component parts and has small space requirement without taking up additional structural space between the vehicle floor and seat side part, guarantees a play-free locking with a horizontal mass compensation in the event of a crash and thus ensures high operating comfort when removing the vehicle seat from the vehicle and when inserting the vehicle seat into the vehicle.

The slide control which acts between the vehicle seat, the locking element and the unlocking lever thereby fulfils both a locking and an unlocking function and can be arranged as a flat component part on a seat side part fulfilling static functions or a guide rail of the vehicle seat, so that the space required is minimised and no additional structural space is needed between the vehicle floor and seat side part.

Furthermore the slide control ensures with its two movement phases during unlocking of the vehicle seat a defined intermediate position at the end of the first movement phase with a self hold of the locking element in which the pre-requirements for a release are provided, but where an interruption in further removal of the vehicle seat does not lead to releasing of the lock. Only on further movement of the unlocking lever or vehicle seat in the removal direction is the vehicle seat released from the vehicle floor and can be removed with minimal effort from the vehicle.

The split into two movement phases when unlocking the vehicle seat provides the condition that automatic locking of the vehicle seat is ensured when re-inserting the seat back into the vehicle on reaching an end position since even when inserting the vehicle seat into the vehicle only the situation must be reached which is achieved at the end of the first movement phase during removal of the vehicle seat.

Finally the slide guide also ensures a play-free locking of the vehicle seat with the vehicle floor which engenders particularly in a crash situation a mass compensation, ie stops movements of the seat side part or guide rail in the vehicle longitudinal direction and thus undesired relative movements up to the separation of the vehicle seat from the vehicle floor.

In order to ensure that the locking of the vehicle seat with the vehicle floor is not lifted until the end of the first phase of the slide control, according to a further feature of the solution according to the invention the slide control switches the locking element when the unlocking lever is not actuated in the first phase for unlocking the vehicle seat over the entire displacement phase of the unlocking lever until reaching the predetermined intermediate position of the unlocking lever back into the locking position.

At the start of the second phase, ie with a continuation of the removal of the vehicle seat the slide control switches the locking element over and pretensions it in the direction of the unlocking position so that the locking element is automatically held in the opened position, ie in the unlocking position.

An advantageous development of the solution according to the invention consists in that the intermediate position of the unlocking lever is determined through a stop mounted on the seat side part or guide rail and that the second phase for unlocking the vehicle seat is introduced through further actuation of the unlocking lever into the direction of unlocking the vehicle seat.

The stop for the unlocking lever provides a defined position of the unlocking lever during unlocking of the vehicle seat in which the end of the first phase of the slide control is achieved. If for further removal of the vehicle seat the unlocking lever is pressed against the stop then the second phase of the slide control is introduced in which the connecting element stops on a claw of the locking element and thereby pivots the locking element into the unlocking position. The locking element is thereby released from its lock with the floor bolt and the unlocking lever bearing against the stop can be used as a handle for further removal of the vehicle seat.

In order to ensure that the unlocking lever up to the end of the first phase of the slide control is again moved back into its position corresponding to locking of the vehicle seat, the unlocking lever is pretensioned in the first phase in the direction of the locking position. Since the switch element of the slide control has still not switched over by the end of the first movement phase of the slide control, the spring tension of the unlocking lever leads to unrestricted return of the unlocking lever into the starting position in which the vehicle seat is locked with the vehicle floor.

The slide control preferably has a first slide control element for generating a sliding and pivoting movement of the locking element, a second slide control element for guiding the locking element in the longitudinal direction of the vehicle seat and preparing a pivotal axis for the locking element, a third slide control element for controlling and locking as well as unlocking the locking element and a switch spring which pretensions the locking element in the locking position and in the first phase for unlocking the vehicle seat in the direction of maintaining the lock between the connecting element and locking element and in the second phase for unlocking the vehicle seat pretensions the locking element in the direction of the unlocking position.

By splitting up this slide control into individual slide control elements the unlocking of the vehicle seat is carried out in separate movement phases in which each time defined positions are guaranteed which are secure in relation to the locking and removal of the vehicle seat.

An embodiment of the slide control is characterised in that the slide control elements have first, second and third slides mounted in the locking element, that first and second guide bolts connected to the seat side part or guide rail engage in the first and second slide, that a control and locking bolt connected to the unlocking lever engages in the third slide and that the switch spring is mounted between the locking element and a connection on the seat side part or guide rail.

Furthermore the third slide has a contact bearing edge for the control and locking bolt and a clearance section for the control and locking bolt so that the unlocking position can be reached. The unlocking lever is attached in relation to the contact bearing edge of the first slide so that during actuation of the unlocking lever the locking element is moved against the spring force of the switch spring.

Since the control and locking bolt up to the end of the first phase of the slide control bears against the contact bearing edge, the unlocking lever on ceasing the removal of the vehicle seat is as a result of the pretension of the unlocking lever towards its starting position moved back into this position. Only on continuing removing the vehicle seat is the control and locking bolt connected to the unlocking lever moved into the clearance section of the third slide and held in this position in conjunction with the switching over of the locking position into the unlocking position in the second phase of the slide control.

A further advantageous development of this embodiment of the solution according to the invention is characterised in that the contact bearing edge defines a vertical slot whose width corresponds to the diameter of the control and locking bolt and which changes into the clearance section.

Since the control and locking bolt is guided in the locking position as well as in the first phase of the slide control substantially without play in the vertical slot of the third slide guide and the unlocking lever is connected through its attachment to the seat side part or guide rail, a likewise play-free connection is ensured between the locking element and the floor bolt so that relative movements between the seat side part or guide rail and the vehicle floor can be eliminated.

A further development of the solution according to the invention is characterised in that the second slide guide is designed as a longitudinal slide formed in the longitudinal direction of the vehicle seat which with the control and locking bolt sliding along the contact bearing edge of the third slide caused through actuation of the unlocking lever in the first phase for unlocking the vehicle seat on interaction with the guide bolt permits solely a longitudinally aligned movement of the locking element in the direction of the connection of the unlocking lever.

The first slide guide has a slide section aligned in the longitudinal direction of the vehicle seat, and a swivel section lying on a radius about the second guide bolt whereby the first guide bolt engaging in the first slide in the first phase for unlocking the vehicle seat engages in the slide section and in the second phase for unlocking the vehicle seat engages in the swivel section of the first slide by the locking element swivelling about the second guide bolt.

The shaping of the first slide causes the change-over process when changing from the first phase of the slide control to the second phase with a continued actuation of the unlocking lever with withdrawal of the vehicle seat from the vehicle and enables a pivoting of the locking element about the second guide bolt with the possibility of further removal of the vehicle seat through the unlocking lever bearing against the stop.

The pretension of the unlocking lever in the direction of its starting position is preferably caused by an unlocking lever spring which is attached on the side of the unlocking lever opposite the control and locking bolt in relation to the connection of the unlocking lever which is provided with an actuating handle.

In order to ensure the unlocking at the start of the second phase, the switch spring is connected to the locking element so that the torque exerted on the locking element by the switch spring in relation to the second guide bolt is greater than the torque exerted by the unlocking lever spring on the locking element in relation to the second guide bolt.

In the first phase of unlocking of the vehicle seat the locking element thus executes through the slide control a purely swivel movement in the longitudinal direction of the vehicle until the unlocking lever comes to bear against the stop. Through the action of the switch spring the unlocking process is reversed up to the end of the first phase and the locking element is returned to its original locking position and the unlocking lever is returned to the locked starting position through the action of the unlocking lever spring. The vehicle seat is thereby not unlocked up to the end of the first phase. At the start of the second phase the vehicle seat can be unlocked through the unlocking lever bearing against the stop by switching over the slide control and can then be removed from the vehicle.

The unlocking lever is preferably provided with an identification which can be visible in the unlocking position of the vehicle seat.

The identification informs the user that the vehicle seat is in the unlocked position in which the switch spring is pretensioned towards the unlocked position and maintains the unlocking position.

For automatically locking the vehicle seat to the vehicle floor the locking element has in a further embodiment a claw engaging in the locking position about the floor bolt and opposite which is a control edge of the locking element which as the vehicle seat is inserted strikes against the floor bolt triggering an automatic locking of the locking element with the floor bolt.

During the automatic locking of the locking element with the floor bolt the locking element preferably swivels through the control edge striking the floor bolt against the spring force of the switch spring about the second guide bolt into the locking position in which the claw of the locking element engages about the floor bolt.

In order to facilitate insertion of the vehicle seat into the vehicle and subsequent locking of the locking element with the floor bolt a bearing block which is connected to the seat side part or guide rail has on each side of a recess adapted to the floor bolt guide ramps which centre the bearing block relative to the floor bolt as the vehicle seat is inserted.

BRIEF DESCRIPTION OF THE DRAWINGS

The invention will now be explained with reference to an embodiment illustrated in the drawings.

FIG. 1 is a diagrammatic side view of a vehicle seat which is connected to a vehicle floor through a front seat connection and a rear seat lock;

FIG. 2 is a detailed view of the rear seat lock in a locking position;

FIG. 3 is a detailed view of the rear seat lock at the end of the first phase of a slide control of the rear seat lock and FIG. 4 is a detailed view of the rear seat lock in the unlocked state.

DETAILED DESCRIPTION

The vehicle seat illustrated in a diagrammatic side view in FIG. 1 has a seat side part or a guide rail 1 on which a seat cushion 2a is fixed and to which a seat back 2b is connected for swivel movement. The seat side part or guide rail 1 is connected to a vehicle floor through a front seat connection and a rear seat lock. The front seat connection consists of a claw 3 open to the front into which a bolt 4 engages which is fixed on the floor. The rear seat lock consists of a bearing block 5 which is connected to the seat side part or guide rail 1 and which holds in a recess a floor bolt 6 which is connected to the vehicle floor, as well as of a locking element 7 which engages in a locking position with a claw 70 about the floor bolt 6.

The locking position can be lifted by an unlocking lever 8 so that the locking element 7 moves out of engagement with the floor bolt 6 and the vehicle seat can be released against the driving direction from its anchorage with the bolt 4 fixed on the floor as well as from the floor bolt 6 and can be removed from the vehicle.

The locking of the vehicle seat to the vehicle floor as well as the individual phases of the unlocking for removing the vehicle seat will now be described below with reference to FIGS. 2 to 4 in the drawings.

FIG. 2 shows a view of the rear seat lock of the vehicle seat in the locking position in which the floor bolt 6 is located in a recess 50 which matches the contour of the floor bolt 6 and is provided in the bearing block 5 which is connected to the seat side part or guide rail 1 and is embraced by the claw 70 of the locking element 7 so that the floor bolt 6 is enclosed by the recess 50 of the bearing block 5 and the claw 70 of the locking element 7.

The locking element 7 is provided with a slide control which is released by actuating the unlocking element 8 and will be described below.

A first slide control element consists of a first slide guide 11 mounted in the locking element 7 in which a first guide bolt 14 engages and its position relative to the first slide guide 11 can be moved from a sliding section 111 to a swivel section 112 which describes a radius about a second guide bolt 15 which engages in a second or longitudinal slide guide 12 of a second slide control element aligned in the longitudinal direction of the vehicle and produces a swivel axis for the locking element. A third slide control element is comprised of a third slide guide 13 provided in the locking element 7 and of a control and locking bolt 16 which is connected to the end of the unlocking lever 8. The third slide guide 13 has a contact bearing edge 131 aligned perpendicular to the vehicle longitudinal direction as well as a clearance section 132. The contact bearing edge 131 is a part of a vertical slot 133 of the third slide guide 13 whose slot width corresponds to the diameter of the control and locking bolt 16. The contact bearing edge 131 changes in its lower end into the clearance section 132 for the control and locking bolt 16 so that the locking element can reach the unlocking position.

The unlocking lever 8 is attached to a pivot point 20 which is connected to the seat side part or guide rail 1 and is provided with an actuating handle and is pretensioned through an unlocking lever spring 17 which is connected on one side through a first spring connection 21 to the seat side part or the guide rail 1 and through a second spring connection 22 to the unlocking lever 8.

A switch spring 10 is connected on one side to a pin 18 connected to the seat side part or guide rail 1 and on the other to the opening 19 of the locking element 7 and is aligned substantially in the vehicle longitudinal direction.

The control and locking bolt 16 which is connected to the unlocking lever 8 is located in the locking position illustrated in FIG. 2 as a result of the pretension of the unlocking lever 8 produced through the unlocking lever spring 17 against the upper stop of the vertical slot 133 of the third slide guide 13.

Furthermore the first guide bolt 14 of the first slide control element 11, 14 is located at the rear stop, in the driving direction, of the slide section 111 of the first slide guide 11 which is relevant for a sliding and swivel movement. The second guide bolt 15 is likewise located on the rear stop, in the driving direction, of the second slide or longitudinal slide 12 of the second slide control element 12, 15.

In this locking position the switch spring 10 is pretensioned in the direction of the locked position of the locking element 7 and the control and locking bolt 16 secures the locking position whereby its position is secured both through the switch spring 10 which is designed as a tension spring and through the unlocking lever spring 17 which is likewise designed as a tension spring so that the control and locking bolt 16 cannot be unlocked. The interaction of the switch spring 10 and the unlocking lever spring 17 in conjunction with the positioning of the control and locking bolt 16 in the vertical slot 133 of the third slide guide 13 ensures the play-free positioning of the vehicle seat even in the event of a crash through the connection of the control and locking bolt 16 to the pivotal point 20 of the unlocking lever 8.

In order to unlock the vehicle seat the unlocking lever 8 is pivoted in the direction of the arrow E against the pretensioning force of the unlocking lever spring 17 about the connection 20 whereby the control and locking bolt 16 is moved along the contact bearing edge 131 of the third slide 13. As a result of the first and second guide bolt 14, 15 mounted in the first and second slide guide 11, 12 only a longitudinal movement of the locking element 7 in the direction of the arrow L is possible which is thus moved against the pretensioning force of the switch spring 10 opposite the driving direction until the unlocking element 8 comes to bear against the stop 9 which is connected to the seat side part or guide rail 1.

In this intermediate position shown in FIG. 3 at the end of a first phase of the unlocking of the vehicle seat with a pure displacement movement of the locking element 7 from the locking position to the position illustrated in FIG. 3 the first guide bolt 14 is located at the transition 113 between the sliding section 111 and the swivel section 112 of the first slide guide 11 and the second guide bolt 15 is located at the front stop of the second slide guide 12. The vehicle seat is thus prepared for unlocking but is still not yet unlocked so that if the unlocking process is interrupted for example by release of the unlocking lever 8 the original locking position shown in FIG. 2 is automatically restored since the switch spring 10 and the unlocking lever spring 17 are active in the direction of returning the locking element 7 and unlocking lever 8 back to the locking position.

If the unlocking lever 8 on reaching the intermediate position shown in FIG. 3 is actuated further in the direction of the arrow E then the second phase of the unlocking of the vehicle seat as shown diagrammatically in FIG. 4 is then initiated.

Since at the end of the first phase of unlocking of the vehicle seat shown in FIG. 3 the unlocking lever 8 bears against the stop 9 connected to the seat side part or guide rail 1, further lifting of the unlocking lever 8 results in the connecting element 6 stopping against a claw 70 of the locking element 7 and the locking element 7 thereby swivelling into the unlocking position. Through the action of the switch spring 10 the locking element 7 is swivelled about the second guide bolt 15 until the first guide bolt 14 bears against the end edge of the swivel section 112 of the first slide guide 11. Through the swivel movement of the locking element 7 the claw 70 is swivelled out of engagement with the floor bolt 6 and thus releases the locking of the seat side part of guide rail and thus of the vehicle seat with the floor bolt 6.

Since the torque exerted on the locking element 7 by the switch spring 10 in relation to the turning point of the second guide bolt 15 is greater than the torque exerted by the unlocking lever spring 17 on the locking element 7 in relation to the turning point of the second guide bolt 15 the switch spring 17 holds the unlocking position of the locking element 7 in this pretensioned position.

The unlocking of the vehicle seat is at the same time shown optically by marking 80 provided at the end of the unlocking lever 8 where it is set so that it can only be seen by the user when the unlocking lever is in this position.

For a complete removal of the vehicle seat the unlocking lever 8 furthermore bears against the stop 9 so that the vehicle seat can be released from the anchorage with the bolt 4 fixed on the floor against the driving direction also with the front claw 3 attached to the seat side part or guide rail 1 according to FIG. 1.

To replace the vehicle seat in the vehicle and lock the vehicle seat with the floor bolt 6 it is not necessary to actuate the unlocking lever 8 since after connecting the front claw 3 to the bolt 4 fixed on the floor according to FIG. 1 the seat underframe 1 is pivoted about the bolt 4 fixed on the floor whereby longitudinal movements of the seat side part or guide rail 1 are possible also for compensating tolerances since the bearing block 5 has guide ramps 51, 52 through which the bearing block 5 and thus the seat side part or guide rail 1 are centred relative to the floor bolt 6.

The locking element 7 is located as a result of the action of the switch spring 10 furthermore in the pretensioned unlocked position according to FIG. 4 whereby a control edge 71 of the locking element 7 is located in front of the recess 50 for receiving the floor bolt 6 and when fitted onto the floor bolt 6 causes the locking element 7 to swivel about the second guide bolt 15 against the pretensioning force of the switch spring 10. As soon as the locking element 7 has reached the intermediate position shown in FIG. 3 the switch spring 10 changes its action and switches the locking element 7 over into the locking position. The claw 70 of the locking element 7 thereby engages about the floor bolt 6 and the unlocking lever 8 is automatically returned by the pretensioning force of the unlocking lever spring 17 into the locking position shown in FIG. 2.

The solution according to the invention is not restricted to the embodiment described above but can also be produced through different control and switch elements with the same function of the locking element. The use of the device according to the invention is also not restricted to attachment to a seat side part of a vehicle seat but can also be transferred to fitting the connecting device to a seat adjustment rail or the like through which a longitudinal adjustment of the vehicle seat is possible and the connecting device permits removal of the seat.

The invention claimed is:

1. A device for connecting a vehicle seat to a vehicle floor comprising:
    a locking element being connected to one of a seat side part and a guide rail of the vehicle seat and being actuatable by means of an unlocking lever;
    at least one connecting element attached to the vehicle floor, the connecting element being operable to be brought into engagement with the locking element;
    a slide control element which acts between one of the seat side part, the guide rail of the vehicle seat, the locking element and the unlocking lever;
    wherein the slide control element, in a locking position and in a first phase for unlocking the vehicle seat by actuating the unlocking lever up to a predetermined intermediate position of the unlocking lever, maintains the lock between the connecting element and the locking element and is, upon actuation by means of the unlocking lever, operable to move the locking element in a longitudinal direction with respect to the one of the seat side part and the guide rail into the intermediate position:
    wherein the slide control element, in a second phase, for unlocking the vehicle seal is operable to switch the locking element, by pivoting the locking element, into an unlocking position in which the lock between the connecting element, the locking element and the one of the seat side part and the guide rail of the vehicle seat is cancelled.

2. The device according to claim 1, wherein, in the first phase for unlocking the vehicle seat, the slide control element is operable to switch the locking element back into the locking position upon releasing the unlocking lever.

3. The device according to claim 1, wherein, in the second phase for unlocking the vehicle seat the locking element is pretensioned to the unlocking position.

4. The device according to claim 1, wherein the intermediate position of the unlocking lever is determined through a stop mounted on the one of the seat side part and on the guide rail and that the second phase for unlocking the vehicle seat is introduced through further actuation of the unlocking element in a direction of unlocking the vehicle seat.

5. The device according to claim 4, wherein in the second phase for unlocking the vehicle seat the connecting element stops against a claw of the locking element and swivels the locking element into the unlocking position.

6. The device according to claim 1, wherein the unlocking lever is pretensioned in the first phase in a direction of a starting position corresponding to the locking position.

7. A device for connecting a vehicle seat to a vehicle floor, the vehicle floor having at least one connecting element which can be brought into engagement with a locking element which is connected to one of a seat side part and a guide rail of the vehicle seat and is actuated by an an unlocking lever, wherein a slide control element which acts between the one of the seat side part and guide rail of the vehicle seat, the locking element and the unlocking lever and which in a locking position and in a first phase for unlocking the vehicle seat, by actuating the unlocking lever up to a predetermined intermediate position of the unlocking lever, maintains the lock between the connecting element and the locking element and in a second phase, for unlocking the vehicle seat switches the locking element over into an unlocking position in which a lock between the connecting element, the locking element and the one of the seat side part and guide rail of the vehicle seat is lifted: and wherein the slide control element has
a first slide control element generating a sliding and swivel movement of the locking element;
a second slide control element guiding the locking element in a longitudinal direction of the vehicle seat and forming a swivel axis;
a third slide control element controlling and locking as well as unlocking the locking element and
a switch spring which in the locking position and in the first phase for unlocking the vehicle seat pretensions the locking element in a direction of maintaining the lock between the connecting element and locking element and in the second phase for unlocking the vehicle seat pretensions the locking element in a direction of the unlocking position.

8. The device according to claim 7, wherein the first, second and third slide control elements have first, second and third slide guides mounted in the locking element, wherein a first and a second guide bolt connected to the one of the seat side part and guide rail engage in the first and the second slide guide, respectively, wherein a control and locking bolt connected to the unlocking lever engages in the third slide guide and wherein the switch spring is mounted between the locking element and a connection on the one of the seat side part and guide rail.

9. The device according to claim 8, wherein the third slide guide has a contact bearing edge and a clearance section for the control and locking bolt, and the unlocking lever is attached in relation to the contact bearing edge of the first slide guide so that during actuating of the unlocking lever the locking element is moved against a spring force of the switch spring.

10. The device according to claim 9, wherein the control and locking bolt is guided in the locking position and in the first phase of the slide control substantially free of play in a vertical slot of the third slide guide.

11. The device according to claim 9 or 10, wherein the second slide guide is a longitudinal slide guide which is aligned in the longitudinal direction of the vehicle seat and which, as the control and locking bolt slides along the contact bearing edge of the third slide caused by the actuation of the unlocking lever in the first phase for unlocking the vehicle seat permits in conjunction with the first and second guide bolts solely a movement of the locking element directed in the longitudinal direction in a direction of a connection of the unlocking lever.

12. The device according to claim 8, wherein the first slide guide has a sliding section aligned in the longitudinal direction of the vehicle seat and a swivel section lying on a radius about the second guide bolt, wherein the first guide bolt engaging in the first slide guide, in the first phrase for unlocking the vehicle seat, engages in the sliding section and, in the second phase for unlocking the vehicle seat, engages in the swivel section of the first slide guide in which the locking element is swivelled about the second guide bolt.

13. The device according to claim 8, wherein an unlocking lever spring is attached on side of the unlocking lever opposite the control and locking bolt in relation to a pivotal point of the unlocking lever, the unlocking lever being provided with an actuating handle.

14. The device according to claim 13, wherein the switch spring is connected to the locking element in such a manner that torque exerted on the locking element by the switch spring, in relation to the second guide bolt, is greater than torque excited by the unlocking lever spring on the locking element in relation to the second guide bolt.

15. The device according to claim 1, wherein the unlocking lever is provided with an identification which is visible in the unlocking position of the vehicle seat.

16. The device according to claim 8, wherein the locking element comprises a claw, the claw engaging, in the locking position a floor bolt attached to the vehicle floor, wherein a control edge of the locking element is arranged opposite to the claw, the control edge, when inserting the vehicle seat, striking against the floor bolt and triggering an automatic locking of the locking element with the floor bolt.

17. The device according to claim 16, wherein, with the automatic locking of the locking element with the floor bolt, the locking element is swivelled against a spring force of the switch spring about the second guide bolt into the locking position and the claw of the locking element engages the floor bolt.

18. The device according to claim 1, wherein a bearing block connected to the one of the seat side part and guide rail has on each side of a recess adapted to the floor bolt guide ramps which center the bearing block relative to the floor bolt as the vehicle seat is inserted.

* * * * *

UNITED STATES PATENT AND TRADEMARK OFFICE
CERTIFICATE OF CORRECTION

PATENT NO. : 7,264,293 B2
APPLICATION NO. : 10/547890
DATED : September 4, 2007
INVENTOR(S) : Matthias Fischer It is certified that error appears in the above-identified patent and that said Letters Patent is hereby corrected as shown below:

| | |
|---|---|
| Column 8, line 37, Claim 1 | Delete "seal", Insert --seat,-- |
| Column 8, line 47, Claim 3 | After "wherein", Delete "," |
| Column 9, line 2, Claim 7 | After "an", Delete "an" |
| Column 9, line 12, Claim 7 | After "seat", Insert --,-- |
| Column 9, line 16, Claim 7 | Delete ":", Insert --;-- |
| Column 9, line 46, Claim 9 | Delete "actuating", Insert --actuation-- |
| Column 10, line 3, Claim 11 | Delete "hearing", Insert --bearing-- |
| Column 10, line 13, Claim 12 | Delete "phrase", Insert --phase-- |

UNITED STATES PATENT AND TRADEMARK OFFICE
CERTIFICATE OF CORRECTION

PATENT NO. : 7,264,293 B2
APPLICATION NO. : 10/547890
DATED : September 4, 2007
INVENTOR(S) : Matthias Fischer It is certified that error appears in the above-identified patent and that said Letters Patent is hereby corrected as shown below:

Column 10, line 27, Claim 14    Delete "excited",
Insert --exerted--

Column 10, line 34, Claim 16    After "position",
Insert --,--

Signed and Sealed this

Twenty-ninth Day of July, 2008

JON W. DUDAS
*Director of the United States Patent and Trademark Office*